US012618794B2

(12) United States Patent 
Ponomarev

(10) Patent No.: US 12,618,794 B2 
(45) Date of Patent: May 5, 2026

(54) SENSING ASSEMBLY

(71) Applicant: Analog Devices International Unlimited Company, Limerick (IE)

(72) Inventor: Youri Victorvitch Ponomarev, Rotselaar (BE)

(73) Assignee: Analog Devices International Unlimited Company, Limerick (IE)

( * ) Notice: Subject to any disclaimer, the term of this patent is extended or adjusted under 35 U.S.C. 154(b) by 473 days.

(21) Appl. No.: 17/737,914

(22) Filed: May 5, 2022

(65) Prior Publication Data

US 2023/0358701 A1 Nov. 9, 2023

(51) Int. Cl.
*G01N 27/327* (2006.01)
*G01N 27/30* (2006.01)

(52) U.S. Cl.
CPC ....... *G01N 27/3272* (2013.01); *G01N 27/301* (2013.01); *G01N 27/3274* (2013.01)

(58) Field of Classification Search
CPC ............. G01N 27/3272; G01N 27/301; G01N 27/3274; G01N 27/4166; G01N 33/487; B01L 2200/148; B01L 2300/0645; B01L 3/502715
See application file for complete search history.

(56) References Cited

U.S. PATENT DOCUMENTS 4,714,527 A * 12/1987 Hofmeier ............... G01N 27/30
205/789
5,441,625 A 8/1995 Ritter et al.

2003/0029722 A1 2/2003 Erdosy et al.
2004/0188252 A1 9/2004 Chan et al.
2009/0205974 A1* 8/2009 Sivan ................. B01D 15/3885
205/687

(Continued)

FOREIGN PATENT DOCUMENTS

| CN | 105116032 A | 12/2015 |
| JP | S57108151 U | * 7/1982 |
| JP | 61140959 U | 9/1986 |

(Continued)

OTHER PUBLICATIONS

Fanavoll et al., A microfluidic electrochemical cell with integrated PdH reference electrode for high current experiments, Electrochimica Acta, 2017, 225, 69-77 (Year: 2017).*

(Continued)

*Primary Examiner* — Shizhi Qian
(74) *Attorney, Agent, or Firm* — Knobbe, Martens, Olson & Bear, LLP

(57) ABSTRACT

The present disclosure provides a sensing assembly for sensing a property of a fluid sample comprising at least one working electrode provided in the primary fluid channel configured to sense a property of a fluid sample in the primary fluid channel; a secondary fluid channel adjacent to and fluidly connected to the primary fluid channel along the primary flow path; and a reference electrode element provided in the secondary fluid channel. The secondary fluid channel is arranged as a branch from the primary flow channel so as to limit the flow of fluid sample from the primary flow channel to the reference electrode element. Alternatively or additionally, a method comprises determining a property of a sample comprising providing such a sensing assembly.

16 Claims, 10 Drawing Sheets

(56) References Cited

U.S. PATENT DOCUMENTS

| | | | |
|---|---|---|---|
| 2019/0134632 A1 | 5/2019 | Ebejer et al. | |
| 2024/0060931 A1* | 2/2024 | Iwasawa | G01N 27/333 |

FOREIGN PATENT DOCUMENTS

| | | | |
|---|---|---|---|
| JP | H03115849 A | * | 5/1991 |
| JP | 2016109690 A | | 6/2016 |
| JP | 2017032405 A | | 9/2017 |
| JP | 6288977 B2 | | 3/2018 |

OTHER PUBLICATIONS

Etsuo et al., English translation of JPS57108151U, 1982 (Year: 1982).*

International Search Report issued in International Application No. PCT/EP2023/061386, dated Aug. 9, 2023.

Written Opinion issued in International Application No. PCT/EP2023/061386, dated Aug. 9, 2023.

Japanese Office Action dated Nov. 11, 2025 in application No. 2024-564949.

Office Action received in Japanese Patent Application No. 2024-564949, dated Feb. 24, 2026.

* cited by examiner

SENSING ASSEMBLY

FIELD OF THE DISCLOSURE

This disclosure relates to a sensing assembly, a system comprising a sensing assembly and method for determining a property of a fluid sample.

BACKGROUND

Various sensor assemblies are known for determining properties of a sample. Electronic sensors can use electrodes to measure properties of a sample using electrodes. For example, electrochemical sensors can be used to detect the presence of particular analytes or take measurements such as conductivity or pH. These systems employ reference electrodes, which have a relatively stable and analyte-independent potential, to provide a benchmark against which the potential of a working electrode can be compared.

Reference electrodes typically comprise an enclosure in which a reference electrolyte (e.g. a reference solution) is held, an electrode immersed in the reference electrode solution and an interface with the sample that is to be measured. Where the sample and reference solution are both liquids, this can be a liquid-junction. Often, this the sample and reference electrolytes will be separated by a frit (e.g. a porous member) and/or salt bridge. Typically reference electrodes are a combination of a slowly-dissolving conductive salt in a defined reference electrolyte (with diffusion junction to the main electrolyte), with AgCl salt as an example. The reference electrolyte has to have a sufficiently high concentration of Cl– ions to keep the potential stable, and, e.g., 3M KCl aqueous solution is commonly used.

However, such reference electrodes are complex to integrate, particularly into smaller sensing assemblies. This type of reference electrode can also be incompatible with the need to store some systems in a dried state (i.e. without an electrolyte or sample) for several months/years before their first use.

Moreover, in many modern sensing systems, such as in-line sensing systems which take multiple samples over a prolonged period of time, it is important to ensure that the reference electrode maintains a stable potential to ensure accurate measurements of potentiometric and amperometric sensors.

SUMMARY OF THE DISCLOSURE

The present disclosure provides a sensing assembly for sensing a property of a fluid sample comprising at least one working electrode provided in the primary fluid channel configured to sense a property of a fluid sample in the primary fluid channel; a secondary fluid channel adjacent to and fluidly connected to the primary fluid channel along the primary flow path; and a reference electrode element provided in the secondary fluid channel. The secondary fluid channel is arranged as a branch from the primary flow channel so as to limit the flow of fluid sample from the primary flow channel to the reference electrode element. Alternatively or additionally, a method comprises determining a property of a sample comprising providing such a sensing assembly.

In one embodiment, a sensing assembly for sensing a property of a fluid sample comprises: a primary fluid channel providing a primary flow path for a fluid sample; at least one working electrode provided in the primary fluid channel configured to sense a property of a fluid sample in the primary fluid channel; a secondary fluid channel adjacent to and fluidly connected to the primary fluid channel along the primary flow path; and a reference electrode element provided in the secondary fluid channel, wherein the secondary fluid channel is arranged as a branch from the primary flow channel so as to limit the flow of fluid sample from the primary flow channel to the reference electrode element.

In one embodiment, a system for sensing a property of a fluid sample comprises a sensing assembly according to any of the embodiments disclosed herein; and a fluid delivery assembly configured to deliver fluid to the primary fluid channel along the primary flow path.

In one embodiment, a method for determining a property of a sample comprises: providing a sensing assembly for sensing a property of a fluid sample, the sensing assembly comprising a primary fluid channel providing a primary flow path for a fluid sample, at least one working electrode provided in the primary fluid channel configured to sense a property of a fluid sample in the primary fluid channel, a secondary fluid channel adjacent to and fluidly connected to the primary fluid channel along the primary flow path; and a reference electrode element for providing a reference electrode signal provided in the secondary fluid channel, wherein the secondary fluid channel is arranged as a branch from the primary fluid channel so as to limit the flow of fluid sample from the primary fluid channel to the reference electrode element; providing a fluid sample to the primary fluid channel; and determining the property of the fluid sample, based at least in part on sensor signals received from the sensor assembly.

BRIEF DESCRIPTION OF THE DRAWINGS

The present invention will now be described in more detail with reference to the accompanying drawings, which are not intended to be limiting.

DETAILED DESCRIPTION

Figure 1:
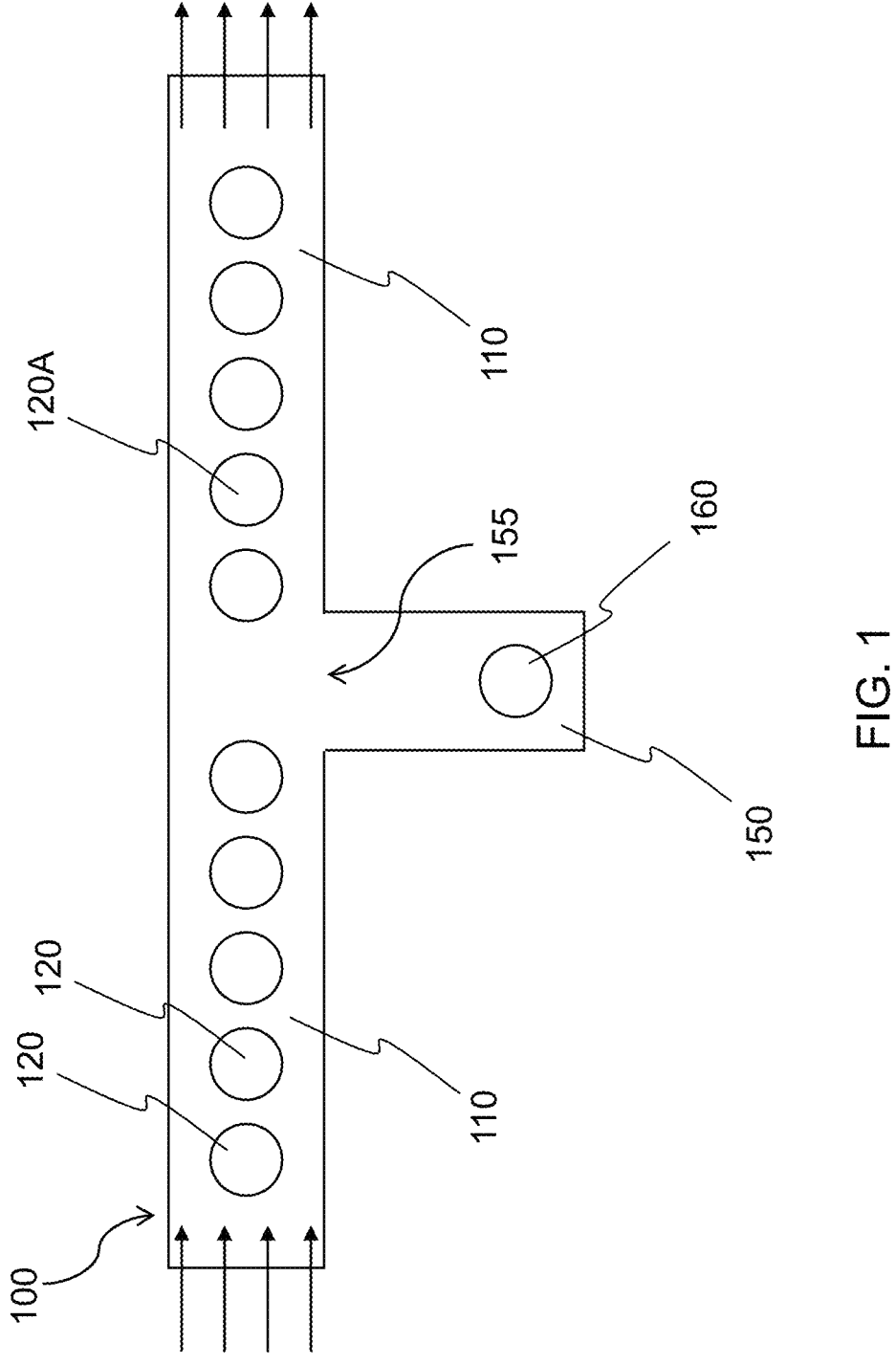
FIG. 1 provides a schematic plan view of a sensing assembly according to an embodiment.

Traditional reference electrodes typically are a combination of a slowly-dissolving conductive salt in a defined reference electrolyte (with diffusion junction to the main electrolyte), with AgCl salt as an example. The reference electrolyte has to have a sufficiently high concentration of Cl– ions to keep the potential stable, and, e.g., 3M KCl aqueous solution is commonly used. However, such reference electrodes are complex to integrate, particularly into smaller sensing assemblies. This type of reference electrode can also be incompatible with the need to store some systems in a dried state (i.e. without an electrolyte or sample) for several months/years before their first use. There are also difficulties in miniaturising these systems and conventional designs are not suited for mass production, such as the semiconductor processing used for most of the remaining parts of modern sensor systems. Moreover, in many modern sensing systems, such as in-line sensing systems which take multiple samples over a prolonged period of time, it is important to ensure that the reference electrode maintains a stable potential to ensure accurate measurements of potentiometric and amperometric sensors.

In one embodiment, a sensing assembly for sensing a property of (e.g. a parameter of or analyte in) a fluid sample comprises a primary fluid channel providing a primary flow path for a fluid sample; at least one working electrode provided in the primary fluid channel configured to sense a property of (e.g. a parameter of or analyte in) a fluid sample in the primary fluid channel; a secondary fluid channel adjacent to and fluidly connected to the primary fluid channel along the primary flow path; and a reference electrode element provided in the secondary fluid channel. The secondary fluid channel is arranged as a branch from the primary fluid channel so as to limit the flow of fluid sample from the primary fluid channel to the reference electrode element.

Embodiments advantageously provide a reference electrode which provides a stable potential, yet foregoes the disadvantages associated with existing reference electrode designs.

The reference electrode element is an electrode which acts as a reference electrode when exposed to a fluid, and in particular can be exposed to a reference solution or calibration fluid to provide a stable reference potential. The reference electrode element can thus provide a reference electrode signal indicative of the potential. The provision of a secondary fluid channel with the reference electrode element provided therein means that the reference electrode element is separated from the primary flow path, thereby limiting the exposure of the reference electrode element (and the reference electrode as a whole once formed) to the fluid sample. This in turn reduces the deterioration of the reference electrode as a result of contact with the sample fluid, as explained in more detail below. This combination of the reference electrode element structure and the channel structures avoids the need to incorporate the traditional reference electrode into the structure, enabling miniaturisation of a stable reference electrode.

More particularly, by having the reference electrode element arranged in a secondary fluid channel which is fluidly connected to the primary fluid channel, the reference electrode element is still in communication with the remainder of the system such that it can act as a reference electrode. However, the structure of the primary and secondary fluid channels means that the reference electrode is shielded from the primary fluid flow. In other words, the primary and secondary channel are arranged with the secondary fluid channel branching off the primary fluid channel such that at least a portion of the primary flow does not enter the secondary fluid channel. The branch can be configured or angled to reduce this inflow of fluid into the secondary fluid channel. The secondary fluid channel can therefore form a conduit, enclosure or cove in which a reference solution (e.g. a calibration fluid or a reference electrolyte acting as a reference electrode solution) can be provided. This is sheltered from the primary flow so as to reduce the displacement of reference solution held in the secondary fluid channel and reduce contact of the reference electrode element itself with the sample fluid. This ensures that the potential is dictated by the reference electrode element and the fluid deliberately provided over the reference electrode element (e.g. the reference solution) thereby providing an equilibrium and a stable potential. Contact with the sample fluid, which could disrupt this equilibrium and cause a change in the reference electrode element structure (e.g. by causing salts to dissolve in the sample fluid, particularly the same anion salts as the reference electrodes or anions that would otherwise interact with the reference electrode element surface and modify its electrochemical potential), is reduced or entirely prevented. In other words, the structure of these and the positioning of the reference electrode within the secondary fluid channel in essence replaces the traditional concept of a frit or bridge. This replacement enables the scaling down of the reference electrode and the manufacture using semiconductor fabrication processes and other more efficient manufacturing processes.

This configuration also has particular benefits when used with an intermittent measurement system, such as an in-line measurement system, configured to take measurements are certain intervals and to otherwise remain immersed in a reference solution. For example, many in-line measurement systems will take measurements after intervals of several minutes or even hours. Measurements in such systems can from only a second or a few seconds, up to a minute. In such systems, the electrodes, including working electrodes, will typically sit in a calibration fluid for the interval when not measuring. The structure of the first and secondary fluid channel lends itself particularly to such systems as the secondary fluid channel is structured to retain the reference solution therein (which in this case can be combined with the calibration fluid typically used) and reduce the likelihood that this will be displaced as the sample fluid passes through the primary fluid channel, but the fluid communication means that the reference electrode element can still provide a reference potential measurement for the sensing assembly as a whole.

Moreover, the use of the reference electrode element, which essentially becomes a traditional reference electrode when exposed to a reference solution (electrolyte), increases durability of the system and enables storage for long periods of time without deterioration. Specifically, the structure allows for the reference electrode element to be kept as a dry electrode, which is then covered in fluid (e.g. reference solution) on the first use. This has significant advantages over traditional reference electrodes which are manufactured in sealed enclosures with fluid provided therein on manufacture.

By branch it is meant that the secondary fluid channel is connected to the primary fluid channel but extends or branches off of the primary fluid channel in a direction that is different to the primary fluid channel (i.e. the primary flow path defined by the primary fluid channel). In one embodiment, at least a portion of the secondary fluid channel extends tangentially relative to the primary flow path. Such a configuration can reduce the flow of fluid from the primary flow path (i.e. that defined by the primary fluid channel) into the secondary fluid channel. The secondary fluid channel is fluidly connected to the primary fluid channel and therefore has an opening in connection with the primary fluid channel (i.e. there is an opening in a sidewall of the primary fluid channel). This opening may define a pane that is tangential to the primary flow path, in some embodiments. In other or additional embodiments, the secondary fluid channel is fluidly connected to the primary fluid channel through an inlet portion of the secondary fluid channel, the inlet portion comprising an opening in a sidewall of the primary fluid channel. The inlet portion of the secondary fluid channel can be tangential to the primary flow path. The primary flow path may define a central axis (for example, at the opening to the secondary fluid channel), which the tangent is relative to, with the secondary fluid channel defining a secondary flow path defining a central axis. In an embodiment, the inlet portion of the secondary channel is perpendicular to substantially perpendicular to the primary flow path. In other or additional embodiments, a portion other than the opening of the secondary fluid channel (such as a mid-section or end portion) or the entire secondary fluid channel may extend tangentially to the primary fluid channel. In some embodiments, at least a part (such as the opening or inlet) extends at an angle of 25 degrees to 180 degrees away from a central axis defined by the primary fluid channel. In some embodiments, this can be 30 degrees to less than 180 degrees, 45 degrees to less than 180 degrees, 45 degrees to 135 degrees, 60 degrees to 135 degrees or 60 degrees to 120 degrees. The greater the divergence from the primary flow path, the less there will be ingress of fluid sample into the secondary fluid channel.

The second fluid channel defines a secondary flow path, with the relative configuration of the primary and secondary flow paths configured to reduce the flow of fluid from the primary flow path to the secondary flow path. In some embodiments, less than 20% of the fluid flowing through the primary flow path upstream of the secondary fluid channel enters the secondary fluid channel. In some embodiments, this is less than 10%, or less than 5%. In some embodiments, these amounts are determined by flow rate or by volume.

As noted above, in some embodiments, the secondary fluid channel is fluidly connected to the primary fluid channel through an inlet portion of the secondary fluid channel, the inlet portion comprising an opening in a sidewall of the primary fluid channel. In a further embodiment, the inlet portion of the secondary channel is tapered so as to reduce the diameter of the secondary fluid channel over at least a portion of the length of the secondary fluid channel. Such a configuration can reduce the turbulence at the opening of the secondary fluid channel, and reduce the risk of bubble formation. This can be, for example, a taper from a larger diameter at the opening to a reduced diameter at a point downstream in the secondary fluid channel (such as the end of the inlet). The taper can therefore define a neck portion, which can be a straight taper or may, for example, incorporate rounded corners. In some embodiments, the opening defines an edge or corner (or edges and corners) with the primary fluid channel sidewall(s) and the edge or corners are rounded or blunted.

In some embodiments, the reference electrode element is spaced from the opening of the secondary fluid channel. In other words, the reference electrode element is arranged within the secondary fluid channel and is spaced away from the primary fluid channel such that the reference electrode element is set back from the opening and the primary fluid channel to thereby reduce the likelihood of contact with fluid sample. In some embodiments, the reference electrode is spaced at least 0.5 mm from the opening of the secondary fluid channel. For example, at least 1 mm, at least 2 mm, at least 3 mm, at least 4 mm, at least 5 mm from the opening of the secondary fluid channel. For example, 0.5 mm to 100 mm, 1 mm to 100 mm, 2 mm to 100 mm, 3 mm to 100 mm, 4 mm to 100 mm, 5 mm to 100 mm. For example, 0.5 mm to 20 mm, 1 mm to 20 mm, 0.5 mm to 10 mm or 1 mm to 10 mm from the opening of the secondary fluid channel. The greater the distance, the less likely there will be contamination of the fluid in contact with the reference electrode element in the secondary fluid channel with the fluid sample. In some embodiments, the reference electrode is completely contained within the secondary fluid channel.

Separating or spacing the reference electrode element from the opening can also reduce the likelihood of diffusion of components which could disrupt the stable electrode potential into the channel. For example, where the reference electrode element comprises a salt, the same ions making up the salt could be present in the fluid sample and could diffuse into the secondary fluid channel disrupting the equilibrium. Diffusion the other way would also be possible. Although flow of the sample fluid will be one mode of transfer of the components (such as ions), diffusion can have an effect on the stable electrode potential. The path length can be based on how quickly the component in question can diffuse—i.e. the diffusion coefficient. For example, where the reference electrode element comprises AgCl or, reducing the diffusion of Cl$^-$ ions from the fluid sample into the secondary fluid channel will depend on the diffusion coefficient and the time the fluid sample is in the primary fluid channel. The same is true for Ag$^+$ ions. The distance from the opening to the reference electrode element can be greater than the distance the ions can diffuse in the time the fluid sample is in the channel. That is, In some embodiments, the distance of the reference electrode element from the primary fluid channel (or the opening) for a particular exposure time is greater than or equal to $L_D^{component}$ for that exposure time (i.e. time the primary fluid channel is exposed to the component), where $L_D^{component}$ is the diffusion length for the component (e.g. ion) in question. $L_D^{component}$ is calculated by SQRT ($D_{component}$·exposure time). Of course, the fluid in question will need to be taken into account such that the diffusion coefficient is that of the component (e.g. ion) in the fluid medium that will be present. The skilled person will be able to determine this and other facts based on usual operating parameters (e.g. temperatures).

For example, referring back to the example of an AgCl reference electrode element, taking the diffusion coefficient for Cl$^-$ and assuming an exposure time of 60 s (i.e. that the fluid sample containing Cl$^-$ ions will be passed through the primary fluid channel for a period of 60 s), the distance can be calculated as $L_D^{Cl-}$(60 s)=SQRT($D_{Cl-}$·0.60 s)=0.3 mm. This is based on a diffusion constant of 1.38E$^{-09}$ m$^2$/s, which provides a reasonable estimate for diffusion in the types of solutions used in typical devices, such as blood and water, and at the expected concentrations (e.g. for bodily fluids). Typical diffusion constant values for Cl$^-$ in such solutions, and which provide a useful baseline for calculating distance, range from 1.38E$^{-9}$ to 2.03E$^{-9}$ values. The former is typically used for solutions with a higher ion concentration and the latter for very dilute solutions. These values are particularly useful for estimating distances for embodiments where the assembly is for bodily fluid measurements (e.g. blood) and/or those with a high water content. These values are at 25° C. Thus, the distances listed above can eliminate or reduce the destabilisation of the reference electrode through diffusion of components, such as ions, into the secondary fluid channel.

Accordingly, in one embodiment, the reference electrode element comprises a salt capable of forming at least two ions in solution, and wherein the reference electrode element is spaced from the primary fluid channel by a distance which is greater than the diffusion length for at least one of the ions in a 1 second period. As set out below in more detail, the reference electrode element will typically comprise a metal with the fluid-facing surface covered with a salt of the metal. These are chosen so that the salt is only slightly soluble or slowly dissolves. When the electrode is immersed into an (aqueous) reference solution, which comprises at least one of the ions of the salt, the following occurs: the salt layer serves as medium between electronic conductor (metal) and ionic conductor (aqueous electrolyte). On the metal (electronic) side the charge transfer happens by electronic interactions between metal atoms, while ionic interaction is through dissolution and diffusion of one of the salt ions (usually anion) from the salt layer into the aqueous solution. Using the example of an Ag—AgCl system (where the reference electrode element comprises an Ag metal electrode with a AgCl layer on the surface): AgCl serves as medium between electronic conductor (Ag) and ionic conductor (aqueous electrolyte). On the Ag (electronic) side the charge transfer happens by electronic interactions between Ag atoms, while ionic interaction is through dissolution and diffusion of Cl– ions from AgCl salt into the aqueous solution. The dissolution/diffusion potential will only be constant if the Cl– ion concentration is constant in the electrolyte surrounding the AgCl salt (forming the reference electrolyte). By keeping the metal of the reference electrode element in the reference electrolyte away, by at least a characteristic diffusion length, from the primary fluidic channel where the ion (e.g. anion) concentration can change, this contributes to achieving the stability of the reference potential.

In some embodiments, the secondary fluid channel is enclosed so as to define a recess. In other words, the secondary fluid channel can form an enclosure or cove. In this way, flow through the secondary fluid channel is further reduced by preventing through flow through the secondary fluid channel. In additional or alternative embodiments, the secondary fluid channel may comprise an outlet. In some embodiments where the secondary fluid channel comprises an outlet is enclosed so as to define a recess, the sensing assembly comprises a moveable closure element, such as a valve, for closing the outlet. The outlet can be used to drain fluid in the secondary fluid channel. Such a closure element can be opened when required to assist in filling the secondary fluid channel. For example, during the first use of the sensing assembly and/or after a sample fluid has been passed through the primary fluid channel and the sensing assembly is replenished with a reference solution (e.g. reference electrolyte). The presence of the outlet can make filling more efficient and reduce the risk of bubble formation. Thus, in some embodiments, the secondary fluid channel comprises an outlet and a valve sealing the outlet.

The reference electrode element acts as an electrode in a reference electrode. That is, the reference electrode is formed by the electrode element and the reference solution provided to the secondary fluid channel for example, in a filling operation). This element thus becomes a reference electrode when exposed to a fluid acting as a reference solution (e.g. a calibration fluid or reference electrolyte).

The reference electrode In some embodiments can be based on known reference electrode systems, such as Ag/AgCl reference electrode system, saturated calomel (Hg/Hg$_2$Cl$_2$) reference electrode system or copper(II) sulfate (Cu/CuSO$_4$) reference electrode system. The reference electrode element may comprise or be formed of any material capable of acting as the electrode part of a reference electrode. In some embodiments, the reference electrode element comprises is or is formed of a metal and a metal salt. For example, a metal core with a metal salt layer provided thereon. In such cases, the fluid acting as a reference solution or electrolyte (e.g. the calibration fluid or reference electrolyte) comprises the metal salt (or the ions which form the metal salt) or at least one of the metal or the corresponding ion in the salt. In some embodiments, the metal salt can be a metal halide such that the reference electrode element comprises or is formed of a metal and a metal halide. For example, a metal core with a metal halide layer provided thereon. In such cases, the fluid acting as a reference solution or reference electrolyte (e.g. the calibration fluid) can in some embodiments comprise the halide, such as an excess of the halide. In some embodiments, the metal and metal halide salt pair can be selected from (i) Ag and AgCl or (ii) Hg and Hg$_2$Cl$_2$. In these, the fluid acting as a reference electrolyte (e.g. the calibration fluid or electrolyte) can comprises chloride ions, for example AgCl and/or KCl-containing solutions. These can be saturated solutions. In other embodiments, the metal and metal salt may be selected from copper and copper (II) sulfate. In these, the fluid acting as a reference solution or reference electrolyte (e.g. the calibration fluid) can comprise sulfate ions (such as copper (II) sulfate, such as a saturated copper (II) sulfate solution). The concentration of these solutions (i.e. the reference solution or calibration fluid) is configured so that it provides a stable reference electrode potential when the reference electrode element is immersed in the solution.

These material combinations enable the provision of a stable reference electrode potential while allowing the change in structure and operation of the reference electrode set out herein. For example, as detailed above, the reference solution can be provided to the secondary fluid channel during use (e.g. at a first wetting and/or between measurements), and mixing of the fluid sample with the reference solution is minimised by the structure of the secondary fluid channel relative to the primary fluid channel and the positioning of the reference electrode element within the secondary fluid channel. As such, the relevant ions or components in the reference solution in contact with the reference electrode element remain at a concentration which is sufficient to provide a stable reference electrode potential.

The working electrode(s) present in the primary fluid channel may be electrode(s) that comprise or are formed from copper, nickel, platinum, silver, silver chloride, gold, or other noble metals, or titanium nitride. In one embodiment, the at least one working electrode is an electrode configured to detect the concentration of chloride in a fluid sample. The working electrode in this embodiment may comprise AgCl. For example, this may be an Ag metal electrode with an AgCl layer provided thereon. In some embodiments, the reference electrode comprises Ag metal electrode with an AgCl layer provided thereon and at least one working electrode comprises an Ag metal electrode with an AgCl layer provided thereon.

In some embodiments, the sensing assembly is configured for detection at least one property or analyte in a body fluid. In some embodiments, this can be blood, urea or saliva. In some further embodiments, the at least one working electrode is an electrode configured to detect the concentration of chloride in a fluid sample and the reference electrode element comprises a metal and a chloride-based metal halide, such as Ag and AgCl. Ion concentration (such as chloride concentration) in bodily fluids is an important measurement and it has been found that the structure defined herein is advantageous when used in this context. For example, measurements in such systems do not require long exposure times and the effect on a reference electrode element located within the secondary fluid channel is negligible to the extent that the Ag/AgCl reference electrode formed by the element and the electrolyte (or calibration fluid) provides a stable potential. Once the measurement is complete, the primary fluid channel can be refilled with electrolyte or calibration fluid.

The content of the reference solution in the context of the reference electrode and reference electrode element has been discussed above. However, the reference solution may further comprise components unrelated to the reference electrode. For example, in some embodiments, this may further comprise analytes or have a particular measurable parameter which serves to calibrate the working electrodes. For example, the reference solution may comprise additional components, such as other analytes or may be of a particular pH or conductivity. The reference solution referred to herein can be a calibration fluid or reference electrolyte.

In one embodiment, the sensing assembly further comprises a calibration fluid provided in the secondary fluid channel, wherein the calibration fluid and reference electrode element form a reference electrode. That is, together they provide a stable reference potential. The reference electrode element can be addressed so as to determine the reference potential.

More generally, the sensing assembly In some embodiments can be used in a system or method for the determination of pH (determination of the −log 10 molar concentration of H$^+$ ions), conductivity or analyte concentration. The terms "analyte concentration" or "concentration of the analyte" as used herein may, in certain some embodiments, refer to the activity of the analyte. The system may further comprise a working electrode and a counter electrode.

In some non-limiting examples, the at least one working electrode and the reference electrode element can be mounted on a common substrate, for example a common substrate, such as semiconductor substrate (e.g. a silicon wafer) or a plastic substrate. In alternative examples, the at least one working electrode is mounted on a first substrate, for example a first semiconductor substrate, and the reference electrode element is mounted on a second substrate, for example a second semiconductor substrate, such as a (second) silicon wafer.

The sensing assembly may be compatible with any suitable electrochemical sensing principle. In some embodiments, the sensing assembly comprises an electrochemical cell including a working electrode assembly and a counter electrode. The counter electrode may act as a cathode or anode to the working electrode(s).

In an embodiment, a system for sensing a property of (e.g. a parameter of or analyte in) a fluid sample, comprises a sensing assembly as defined in any of the embodiments set out herein; and a signal processing unit configured to process sensor signals received from the reference electrode element and the at least one working electrode, and a property determination unit configured to, based at least in part on the sensor signals processed from the at least one working electrode and the reference electrode element, determine a property of the fluid sample.

In an embodiment, a system for sensing a property of (e.g. a parameter of or analyte in) a fluid sample, comprises a sensing assembly as defined in any of the embodiments set out herein; and a fluid delivery assembly configured to deliver fluid to the primary fluid channel along the primary flow path. In some embodiments, the system may further comprise a signal processing unit configured to process sensor signals received from the reference electrode element and the at least one working electrode, and a property determination unit configured to, based at least in part on the sensor signals processed from the at least one working electrode and the reference electrode element, determine a property of the fluid sample.

In some embodiments, the system further comprises a reference solution reservoir; and the fluid delivery assembly is configured to deliver the reference solution from the reservoir to the primary fluid channel. In some embodiments, the fluid delivery assembly may be further configured to deliver the reference solution to the secondary fluid channel during an initial filling phase and/or a refilling phase between fluid sample measurements. In some embodiments where a valve and outlet are provided in the filling channel, the fluid delivery assembly may be configured to operate the valve and outlet to assist in filling the secondary fluid channel. This can be directly to the secondary fluid channel or indirectly via the primary fluid channel. In some embodiments, reference solution is to be provided to the working electrode(s) so as to monitor the read out from the working electrode(s) (e.g. drift) such that it can be advantageous to provide the reference solution to the secondary fluid channel via the primary fluid channel. In other embodiments, it may be advantageous to flush the secondary fluid channel directly.

In some embodiments, the fluid delivery assembly is configured to deliver fluid sample to the primary fluid channel. Thus, in some embodiments, the fluid delivery assembly may be configured to deliver both reference solution and fluid sample to the fluid channels. That is, it is configured to deliver the fluid sample to the primary fluid channel and to deliver the reference solution to the secondary fluid channel, in some embodiments via the primary fluid channel. In some embodiments, the fluid delivery assembly is configured to alternate delivery of the reference solution and the fluid sample. This intermittent delivery can improve the stability of the reference electrode by rebalancing the equilibrium within the secondary fluid channel. In some embodiments, the fluid delivery assembly is configured to deliver the reference solution in a flush operation and is configured to deliver the fluid sample in a measurement operation, and wherein the ratio of the measurement operation to the flush operation is at least 1:2. In some embodiments, this is 1:5, 1:10, 1:25, 1:50 or 1:1000. The ratio is determined by the time the fluid delivery assembly exposes the fluid channels to fluid in question. Either operation may therefore include a delivery phase, where the fluid is actively delivered into the channel and there is a flow, and hold phase, where fluid is retained in the channel. In some embodiments, the measurement operation may be less than or equal to 1 second, such as less than or equal to 5 seconds, less than or equal to 10 seconds or less than or equal to 60 seconds. It will be appreciated that a minimum measurement time is necessary, but this will depend on the measurement and system characteristics. In some embodiments, this is at least 0.1 seconds, such as at least 0.5 seconds, or such as at least 1 second. In some embodiments, the flush operation is greater than or equal to 2 seconds, such as greater than or equal to 5 seconds, greater than or equal to 10 seconds, greater than or equal to 60 seconds, greater than or equal to 5 mins, greater than or equal to 30 mins, or greater than or equal to 60 minutes. In some embodiments, the fluid delivery assembly is configured to deliver an initial reference solution to the secondary fluid channel, in some embodiments via the primary fluid channel. This initial fill can take the sensing assembly from a dry state to a ready-to-use state.

The fluid delivery assembly may comprise a controller configured to control delivery of fluid to the fluid channels. This may control the duration of the measurement, flush and fill operations, as required. The controller may be a processor. A processor may be implemented in any suitable manner, with software and/or hardware, to perform the various functions required. One or all of the units may, for example, employ one or more microprocessors programmed using software (for example, microcode) to perform the required functions. Examples of processor components that may be employed in various embodiments of the present disclosure include, but are not limited to, conventional microprocessors, application specific integrated circuits (ASICs), and field-programmable gate arrays (FPGAs).

In one embodiment, the system is an in-line measurement system. For example, the sensing assembly may be provided as an in-line sensor assembly configured to measure a property of a fluid sample in a fluid pathway of a separate system. This can be, for example, directly in-line in the fluid pathway of the separate system or the system may comprise a sampling pathway which intermittently is filled with a fluid sample, with the sensing assembly provided in the sensing pathway.

In one embodiment, the system is a bodily fluid analysis system configured to measure a property of a bodily fluid. In some embodiments, the bodily fluid is selected from blood, urine, mucus or saliva. In some embodiments, the bodily fluid analysis system is an in-line measurement system as set out above. For example, the bodily fluid analysis system may be a dialysis system.

In some embodiments, the system may be configured to receive a signal from the reference electrode element providing an indication of (or a property indicative of) the potential at the reference electrode and, indeed, the other electrodes in the system. The system may further comprise a property determination unit for determining the property that is being measured based on the processed signals. These may take the form of one processor, for example, or may be comprised of several processors. A processor may be implemented in any suitable manner, with software and/or hardware, to perform the various functions required. One or all of the units may, for example, employ one or more microprocessors programmed using software (for example, microcode) to perform the required functions. Examples of processor components that may be employed in various embodiments of the present disclosure include, but are not limited to, conventional microprocessors, application specific integrated circuits (ASICs), and field-programmable gate arrays (FPGAs).

In various implementations, the signal processing unit, property determination unit and/or processor may be associated with one or more non-transitory storage media such as volatile and non-volatile computer memory such as RAM, PROM, EPROM, and EEPROM. The non-transitory storage media may be encoded with one or more programs that, when executed on one or more processors and/or controllers, perform the required functions. Various storage media may be fixed within a processor or controller or may be transportable, such that the one or more programs stored thereon can be loaded into the signal processing unit, property determination unit and/or processor.

In some non-limiting examples, the system includes a user interface, such as a display, for communicating the property determined by the property determination unit.

Alternatively or additionally, the system may include a communications interface device, such as a wireless transmitter, configured to transmit the analyte concentration determined by the property determination unit to an external device, such as a personal computer, tablet, smartphone, remote server, etc.

In one embodiment, a method for determining a property of a sample comprises providing a sensing assembly for sensing a property of (e.g. a parameter of or analyte in) a fluid sample, the sensing assembly comprising a primary fluid channel providing a primary flow path for a fluid sample, at least one working electrode provided in the primary fluid channel configured to sense a property of (e.g. a parameter of or analyte in) a fluid sample in the primary fluid channel, a secondary fluid channel adjacent to and fluidly connected to the primary fluid channel along the primary flow path; and a reference electrode element for providing a reference electrode signal provided in the secondary fluid channel. The secondary fluid channel is arranged as a branch from the primary fluid channel so as to limit the flow of fluid sample from the primary fluid channel to the reference electrode element. The method further comprises providing a fluid sample to the primary fluid channel; and determining the property of the fluid sample, based at least in part on sensor signals received from the sensor assembly.

The method may utilise any of the sensing assemblies or systems disclosed herein.

In some embodiments, the method further comprises providing both reference solution and fluid sample to the fluid channels. That is, providing the fluid sample to the primary fluid channel and to providing the reference solution to the secondary fluid channel, in some embodiments via the primary fluid channel. In some embodiments, method comprises alternating delivery or provision of the reference solution and the fluid sample. This intermittent delivery can improve the stability of the reference electrode by rebalancing the equilibrium within the secondary fluid channel. In some embodiments, method comprises delivering or providing the reference solution in a flush operation and delivering or providing the fluid sample in a measurement operation, and wherein the ratio of the measurement operation to the flush operation is at least 1:2. In some embodiments, this is 1:5, 1:10, 1:25, 1:50 or 1:1000. The ratio is determined by the time the fluid channels (in some embodiments, the primary fluid channel in particular) exposed to fluid in question. Either operation may therefore include a delivery phase, where the fluid is actively delivered into the channel and there is a flow, and hold phase, where fluid is retained in the channel. In some embodiments, the measurement operation may be less than or equal to 1 second, such as less than or equal to 5 seconds, less than or equal to 10 seconds or less than or equal to 60 seconds. It will be appreciated that a minimum measurement time is necessary, but this will depend on the measurement and system characteristics. In some embodiments, this is at least 0.1 seconds, such as at least 0.5 seconds, or such as at least 1 second. In some embodiments, the flush operation is greater than or equal to 2 seconds, such as greater than or equal to 5 seconds, greater than or equal to 10 seconds, greater than or equal to 60 seconds, greater than or equal to 5 mins, greater than or equal to 30 mins, or greater than or equal to 60 minutes. In some embodiments, the method comprises delivering an initial reference solution to the secondary fluid channel, in some embodiments via the primary fluid channel. This initial fill can take the sensing assembly from a dry state to a ready-to-use state.

FIG. 1 provides a schematic plan view of a sensing assembly 100. The sensing assembly 100 comprises a primary fluid channel 110, plural working electrodes 120, 120A provided in the primary fluid channel 110, a secondary fluid channel 150 with an opening 155, and a reference electrode element 160 provided in the secondary fluid channel 150.

The sensing assembly 100 is for sensing a property, such as a parameter of or analyte within a fluid sample. In this embodiment, there are plural working electrodes 120, 120A, each of which can be used to sense a different parameter or analyte such that multiple properties can be determined simultaneously for the same fluid sample using the sensing assembly. In some embodiments, these working electrodes can be configured to determine pH (H⁺ ions), conductivity, temperature and/or the presence of particular analytes, such as ions (chloride ions, potassium ions, sodium ions, calcium ions, and/or magnesium ions), glucose, urea, and/or creatinine. In this particular embodiment, one of the working electrodes 120A is configured to measure the concentration of chloride ions in the solution and is comprised of a silver body with a silver chloride layer provided thereon. The silver chloride coating is arranged to be exposed to the fluid in the primary fluid channel.

The primary fluid channel 110 of the sensing assembly 100 is provided as the main flow path for fluid passing through the sensing assembly 100 and thus defines a primary flow path along its central axis. In this embodiment, the primary fluid channel 110 defines a straight pathway extending from an inlet to an outlet. Fluid samples can be provided along this flow path so that it is brought into contact with the working electrodes 120, 120A. This can be a continuous flow of fluid sample (e.g. liquid sample), or the fluid sample may be provided to the primary fluid channel 110 and fluid flow stopped or reduced to allow the fluid sample to reside in contact with the working electrodes 120, 120A. In FIG. 1, the direction of fluid flow is indicated by the arrows.

Although not visible in FIG. 1, primary fluid channel 110 can take the form of an enclosed fluid channel with a base and sidewalls extending from the base and defining the fluid pathway and with the working electrodes 120, 120A extending through the base. A top cover may also be provided. The working electrodes 120, 120A can be electrically connected to each other and/or external system components via wires or traces, for example which extend underneath the base.

The secondary fluid channel 150 branches off and is fluidly connected to the primary fluid channel 110 at a point along the primary flow path. In this embodiment, the secondary fluid channel 150 is provided at a mid-point along the array of working electrodes 120, 120A located in the primary fluid channel 110. The secondary fluid channel 150 is fluidly connected to the primary fluid channel 110 via an opening 155 in the sidewall of the primary fluid channel 110. The region of the secondary fluid channel 150 extending from the opening 155 inwardly defines an inlet. In this embodiment, the secondary fluid channel 150 is arranged so that the entirety of the secondary fluid channel 150 extends perpendicularly to the primary fluid channel 110. That is, it is branched off from the primary fluid channel 110 in such a way that the secondary fluid channel 150 (and a central axis/fluid flow path defined by the secondary fluid channel) is at 90 degrees to the primary flow path defined by the primary fluid channel 110. This has been found to significantly reduce ingress of fluid passing along the primary flow path into the secondary fluid channel 150. In this embodiment, the secondary fluid channel 150 is sealed with the exception of the opening 155 so as to define an enclosure.

This has been found to further reduce ingress of fluid from the primary fluid channel 110 into the secondary fluid channel 150.

In this embodiment, the reference electrode element 160 is located at the end of the secondary fluid channel 150 opposite the opening 155. In this way, it is spaced apart from the opening 155 and thus the primary fluid channel 110. This reduces the likelihood that fluid in contact with and adjacent the reference electrode element 160 will be displaced by or contaminated with components (such as ions) in a fluid passing through the primary fluid channel 110. In this embodiment, the reference electrode element 160 comprises a silver metal base with a silver chloride coating thereon. The silver chloride coating is arranged so as to contact fluid located in the secondary fluid channel 150.

This configuration has been found to be capable of providing a protective region in the vicinity of the reference electrode element 160 in which minimal fluid disturbance occurs thereby minimising displacement of fluid located in the secondary fluid channel 150. More particularly, by having the reference electrode element 160 arranged in the end of the secondary fluid channel 150 and by having the secondary fluid channel 150 branch off from the primary fluid channel 110 in the manner shown, the reference electrode element 160 is still in communication with the remainder of the sensing assembly 100 (specifically the working electrodes) such that it can act as a reference electrode; however, the reference electrode element 160 (which forms the reference electrode together with reference solution) is shielded from the primary fluid channel 110. This means that the potential is dictated by the reference electrode element and the fluid deliberately provided over the reference electrode element 160 in the secondary fluid channel 150 (e.g. reference solution) thereby providing an equilibrium and a stable potential. Contact with the sample fluid, which could disrupt this equilibrium and cause a change in the reference electrode element 160 structure (e.g. by causing salts to dissolve in the sample fluid), is reduced or entirely prevented.

As with the primary fluid channel 110, the secondary fluid channel 150 can take the form of an enclosed fluid channel with a base and sidewalls extending from the base and defining the fluid pathway and with the reference electrode element 160 extending through the base. A top cover may also be provided. The reference electrode element 160 can be electrically connected to an external system via wires or traces, for example which extend underneath the base.

In use, a first filling operation can be carried out whereby a calibration fluid is provided to the primary fluid channel 110. The calibration fluid is formulated such that can form a reference electrode with a stable reference potential when in contact with the reference electrode element 160. In this particular embodiment, the calibration fluid is a saturated AgCl/KCl solution. The calibration fluid further includes components for calibrating the working electrodes 120. The first filling operation can comprise flowing the calibration fluid through the primary fluid channel 110 until the secondary fluid channel 150 has also been filled with the calibration fluid thus forming the reference electrode. The sensing assembly 100 may be left for a settling period to allow the establishment of the stable reference potential.

A measurement operation can then be carried out whereby a fluid sample is provided to the primary fluid channel 110. The fluid sample is passed over the working electrodes 120, 120A so that these can determine the properties of the fluid sample (e.g. by interrogation of these electrodes). The configuration and arrangement of the secondary fluid channel 150 and the primary fluid channel 110 is such that there is minimal ingress of the fluid sample into the secondary fluid channel 150 during this operation. Flow rate may also be controlled to minimize this. Moreover, the location of the reference electrode element 160 and the spacing of this from the opening 155 minimizes the likelihood that there will be measureable changes to the calibration fluid surrounding the reference electrode element (e.g. by diffusion of ions from the fluid sample and/or a change in concentration of the calibration fluid). This can also be further minimized by minimizing the exposure time of the sensing assembly 100 to the fluid sample.

A flush (or refill) operation can then be carried out whereby the calibration fluid is provided to the primary fluid channel 110 to flush out any fluid sample and return the sensing assembly 100 to its pre-measurement state. This may include a delivery phase, where the calibration fluid is actively delivered into the primary fluid channel 110 and there is a flow, and hold phase, where the calibration fluid is held in the primary fluid channel 110 and secondary fluid channel 150. This operation is typical of intermittent measurement processes and/or in-line measurements and the arrangement of the sensing assembly 100 in this embodiment enables advantage to be taken of the flush or refill operations. That is, this gives the opportunity to return the secondary fluid channel 150 to a state where the fluid in the secondary fluid channel 150 is the calibration fluid (or at least to the extent that the stable reference electrode potential is maintained).

In some embodiments, the flush or refill operation may be longer in duration than the measurement operation, or the delivery phase of the flush or refill operation may be longer in duration than the measurement operation. In this way, the effect of the arrangement of the channels 110, 150 has less impact on the flush or refill operation allowing the secondary fluid channel 150 to be restored.

In some embodiments, the measurement and flush (or refill) operations can be repeated several times. This intermittent delivery can improve the stability of the reference electrode by rebalancing the equilibrium within the secondary fluid channel.

Figure 2:
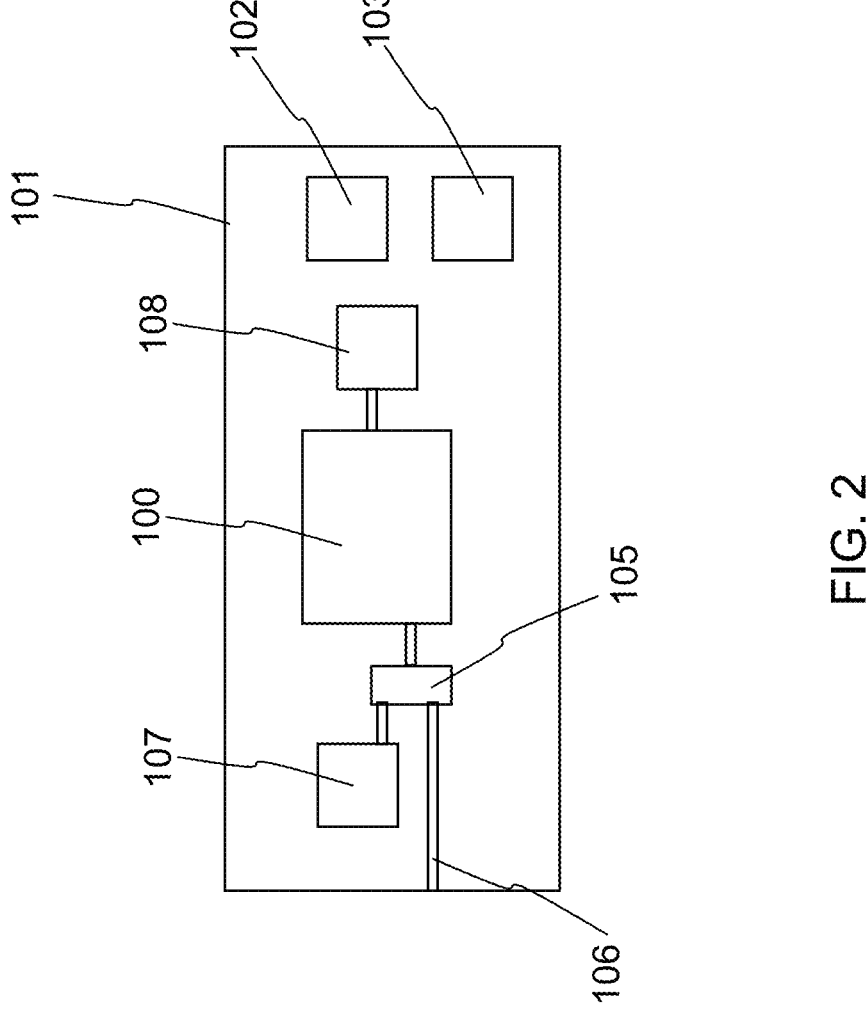
FIG. 2 provides a schematic plan view of a system according to an embodiment.

FIG. 2 provides a schematic overview of a system 101 for determining the property of a fluid sample. The system 101 in this embodiment comprises the sensing assembly 100 of FIG. 1, together with a fluid delivery assembly 105, an influent conduit 106, a calibration fluid reservoir 107, a waste reservoir 108, a signal processing unit 102 and a property determination unit 103.

The fluid delivery assembly 101 is configured to deliver fluid to the primary fluid channel 110 of the sensing assembly 100. In this embodiment, an influent conduit 106 is provided which receives fluid sample. The fluid delivery assembly 101 controls passage of the fluid sample through the influent conduit 106 and into the sensing assembly 100. In this embodiment, the fluid delivery assembly 106 is also configured to deliver fluid from the calibration fluid reservoir 107 to the sensing assembly 100. This may be in accordance with the operations set out above in respect of claim 1. A waste receptacle 108 is provided for receiving fluid after it has passed through the sensing assembly 100.

The system 101 further includes components for addressing the electrodes 120, 120A, 160 of the sensing assembly 100. In particular, it includes a signal processing unit 102 configured to process sensor signals received from the reference electrode element 160 (e.g. a reference electrode signal indicative of the reference electrode potential) and the working electrodes 120, 120A (e.g. a working electrode signal indicative of a property of the fluid sample). The property determination unit 103 is configured to, based at least in part on the sensor signals processed by the signal processing unit 102, to determine a property of the fluid sample.

Figures 3, 4:
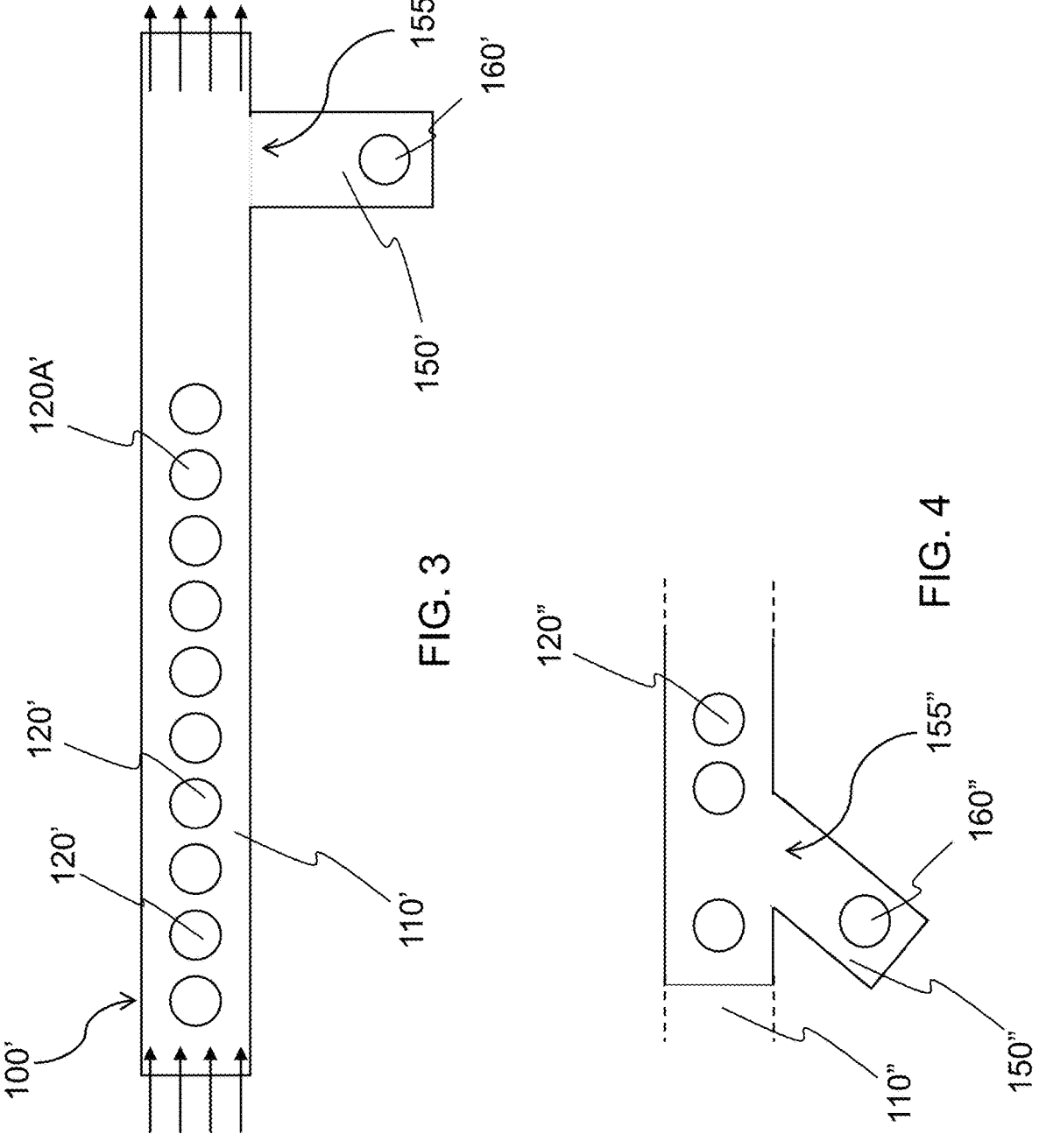
FIG. 3 provides a schematic plan view of a sensing assembly according to an embodiment.
FIG. 4 provides a schematic plan view of a sensing assembly according to an embodiment.

FIG. 3 provides a schematic plan view of a sensing assembly 100'. The sensing assembly 100' incorporates the same components as the sensing assembly 100 of FIG. 1, but with a different configuration of the second fluid channel. The sensing assembly 100' of FIG. 3 therefore comprises a primary fluid channel 110', plural working electrodes 120', 120A' provided in the primary fluid channel 110', a secondary fluid channel 150' with an opening 155', and a reference electrode element 160' provided in the secondary fluid channel 150'.

The sensing assembly 100' of FIG. 3 shows an alternative configuration of the secondary fluid channel 150'. In this embodiment, the secondary fluid channel 150' is provided with the opening 155' provided in a sidewall of the primary fluid channel 110 at a point downstream of the working electrodes 120', 120A'. This can reduce the effects of out-diffusion from the secondary fluid channel 150' on the working electrodes 120', 120A', particularly those downstream of the secondary fluid channel 150'. Otherwise, the structure can be the same as that set out in respect of the sensing assembly 100 of FIG. 1.

FIG. 4 provides a schematic plan view of a portion of a sensing assembly 100". The sensing assembly 100' incorporates the same components as the sensing assembly 100 of FIG. 1, but with a different configuration of the second fluid channel. The sensing assembly 100" of FIG. 4 therefore comprises a primary fluid channel 110", plural working electrodes 120" provided in the primary fluid channel 110", a secondary fluid channel 150" with an opening 155", and a reference electrode element 160" provided in the secondary fluid channel 150".

In this embodiment, the secondary fluid channel 150" is provided at a mid-point along the array of working electrodes 120" located in the primary fluid channel 110". The secondary fluid channel 150" is fluidly connected to the primary fluid channel 110" via an opening 155" in the sidewall of the primary fluid channel 150". The region of the secondary fluid channel 150" extending from the opening 155" inwardly defines an inlet. In this embodiment, the secondary fluid channel 150 is arranged so that the entirety of the secondary fluid channel 150" extends at an angle of 135 degrees relative to the primary fluid channel 110" (the angle being defined with respect to the direction of fluid flow). That is, it is branched off from the primary fluid channel 110" in such a way that the secondary fluid channel 150" (and a central axis/fluid flow path defined by the secondary fluid channel 150") is angled back relative to the primary flow path defined by the primary fluid channel 110". This has been found to significantly reduce ingress of fluid passing along the primary flow path into the secondary fluid channel 150". In this embodiment, the secondary fluid channel 150" is sealed with the exception of the opening 155" so as to define an enclosure. This has been found to further reduce ingress of fluid from the primary fluid channel 110" into the secondary fluid channel 150".

Otherwise, the structure can be the same as that set out in respect of the sensing assembly 100 of FIG. 1.

Figure 5:
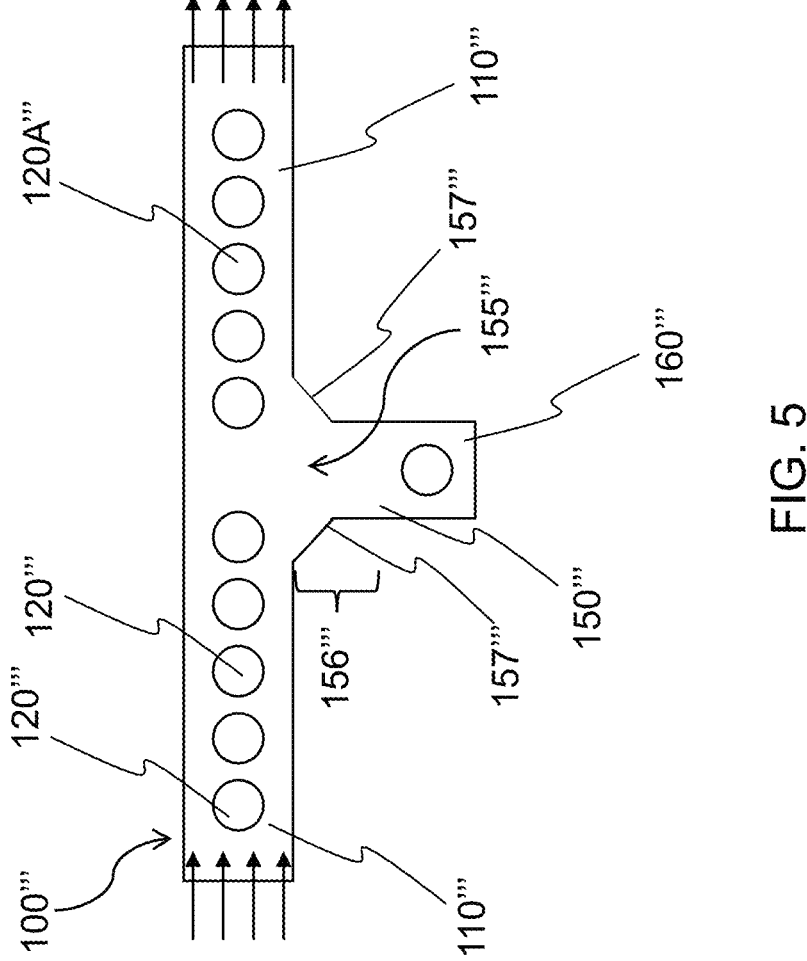
FIG. 5 provides a schematic plan view of a sensing assembly according to an embodiment.

FIG. 5 provides a schematic plan view of a sensing assembly 100'''. The sensing assembly 100''' incorporates the same components as the sensing assembly 100 of FIG. 1, but with a different configuration of the second fluid channel. The sensing assembly 100''' of FIG. 5 therefore comprises a primary fluid channel 110''', plural working electrodes 120''', 120A''' provided in the primary fluid channel 110''', a secondary fluid channel 150''' with an opening 155''', and a reference electrode element 160''' provided in the secondary fluid channel 150''.

In this embodiment, the inlet portion 156''' of the secondary fluid channel 150''', which incorporates the opening 155''' in the sidewall of the primary fluid channel 110''' as well as a portion of the secondary fluid channel 150'''' adjacent the opening 155'''. In this embodiment, the inlet portion 156''' is tapered so that the diameter of the secondary fluid channel 150''' decreases over a part of the length of the inlet 156''' from the opening 155''' over a portion of the length of the secondary fluid channel 150'''. This also incorporates a shaping whereby 90 degree corners of the opening 155''' are eliminated. This can reduce the turbulence at the opening of the secondary fluid channel, and reduce the risk of bubble formation.

Figure 6B:
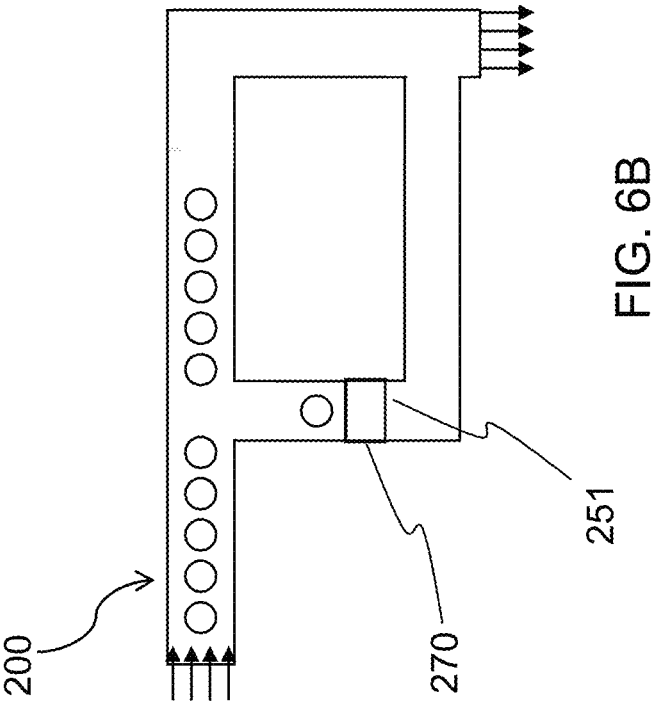
FIGS. 6A and 6B provide a schematic plan views of a sensing assembly according to an embodiment in two different configurations.
Figure 6A:
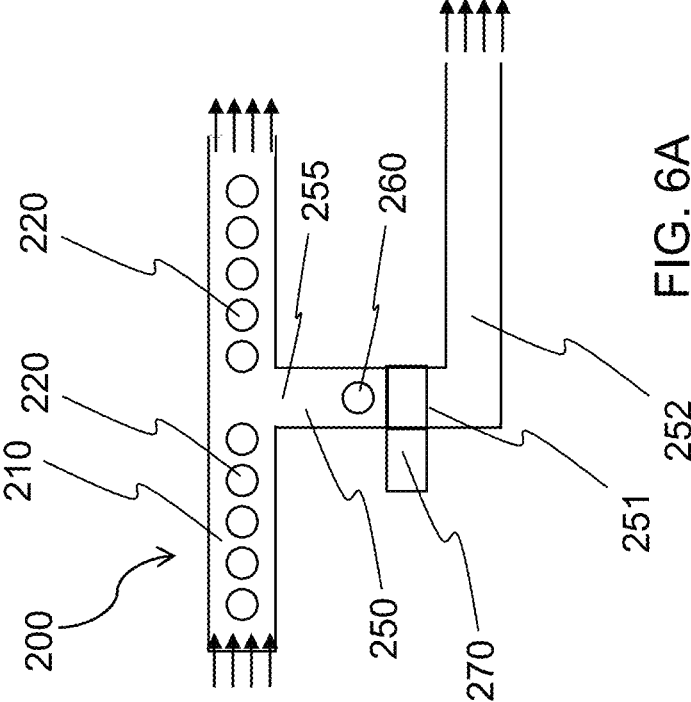

FIGS. 6A and 6B provide a schematic plan view of a sensing assembly 200. The sensing assembly 200 has the same underlying structure as the sensing assembly 100 of FIG. 1 in that comprises a primary fluid channel 210, plural working electrodes 220 provided in the primary fluid channel 210, a secondary fluid channel 250 with an opening 255, and a reference electrode element 260 provided in the secondary fluid channel 250. The sensing assembly 200 further includes an outlet 251 from the secondary fluid channel 250 leading to a drainage channel 252 and a valve 270 which can close outlet 251.

As with the sensing assembly 100 of FIG. 1, the sensing assembly 200 comprises plural working electrodes 220 each of which can be used to sense a different parameter or analyte such that multiple properties can be determined simultaneously for the same fluid sample using the sensing assembly. The primary fluid channel 210 of the sensing assembly 200 is provided as the main flow path for fluid passing through the sensing assembly 200 and thus defines a primary flow path along its central axis. In this embodiment, the primary fluid channel 210 defines a straight pathway extending from an inlet to an outlet. Fluid samples can be provided along this flow path so that it is brought into contact with the working electrodes 220.

As with the sensing assembly 100 of FIG. 1, the secondary fluid channel 250 of the sensing assembly 200 branches off and is fluidly connected to the primary fluid channel 210 at a point along the primary flow path. In this embodiment, the secondary fluid channel 250 is provided at a mid-point along the array of working electrodes 220. The secondary fluid channel 250 is fluidly connected to the primary fluid channel 210 via the opening 255 in the sidewall of the primary fluid channel 210. The secondary fluid channel 250 is arranged perpendicularly to the primary fluid channel 210.

In this embodiment, the secondary fluid channel 250 also comprises an outlet 251 for draining the secondary fluid channel 250. In this particular embodiment, this is located opposite the opening 255. Having an outlet 251 can be advantageous in filling the secondary fluid channel 250 and replacing any fluid within the secondary fluid channel 250 (for example during an initial filling operation or a re-fill or flush operation). This can also help reduce bubble formation.

However, as noted above, having an open outlet can encourage fluid flow through the secondary fluid channel 250, which can be disadvantageous during measurement operations—i.e. when the desire is to reduce fluid flow from the primary fluid channel 210 to the secondary fluid channel 250. Therefore, the sensing assembly 200 further includes the valve 270 which can selectively open or close the outlet

251. In this way, when required, the secondary fluid channel 250 can be closed at the outlet 251 by valve 270 creating an enclosure which can hold the calibration fluid when desired (e.g. during a measurement operation). However, it can be easily drained via the drainage channel 252, as required, by opening the valve 270.

Figure 7:
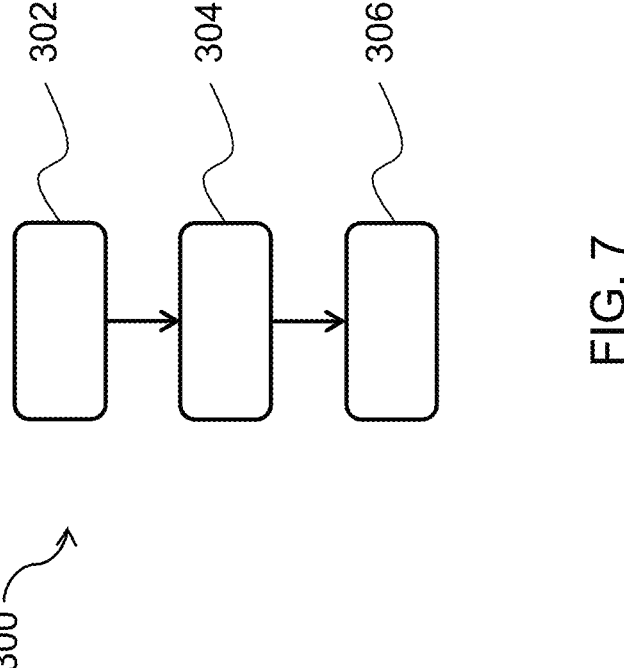
FIG. 7 provides a schematic view of a method according to an embodiment.

FIG. 7 depicts a method for determining a property of a sample, the method comprising providing a sensing assembly for sensing a property of (e.g. a parameter of or analyte in) a fluid sample (method part 302). The sensing assembly comprises a primary fluid channel providing a primary flow path for a fluid sample, at least one working electrode provided in the primary fluid channel configured to sense a property of (e.g. a parameter of or analyte in) a fluid sample in the primary fluid channel, a secondary fluid channel adjacent to and fluidly connected to the primary fluid channel along the primary flow path; and a reference electrode element for providing a reference electrode signal provided in the secondary fluid channel. The secondary fluid channel is arranged as a branch from the primary fluid channel so as to limit the flow of fluid sample from the primary fluid channel to the reference electrode element. The method 300 further comprises providing a fluid sample to the primary fluid channel (method part 304); and determining the property of the fluid sample (method part 306), based at least in part on sensor signals received from the sensor assembly.

EXAMPLES

Example 1

The results of an Example 1 are depicted in FIGS. 8A to 8D in which a sensing assembly 400 having the same structure as that of the sensing assembly 100 of FIG. 1 (with like references referring to like parts) is used to monitor the ingress of chloride ions into the secondary fluid channel 450, which branches off the primary fluid channel 410 in a perpendicular manner. A reference electrode element 460 is provided in the secondary fluid channel 450 and plural working electrodes 420 are provided in the primary fluid channel 410. FIG. 8F depicts the sensing assembly 400 without fluid. In this example, the reference electrode element 460 is positioned 3.0 mm away from the opening of the secondary fluid channel 450 (i.e. with no part of the reference electrode element 460 being closer than 3.0 mm). Total secondary fluid channel 450 depth is 4.0 mm.

Figure 8:
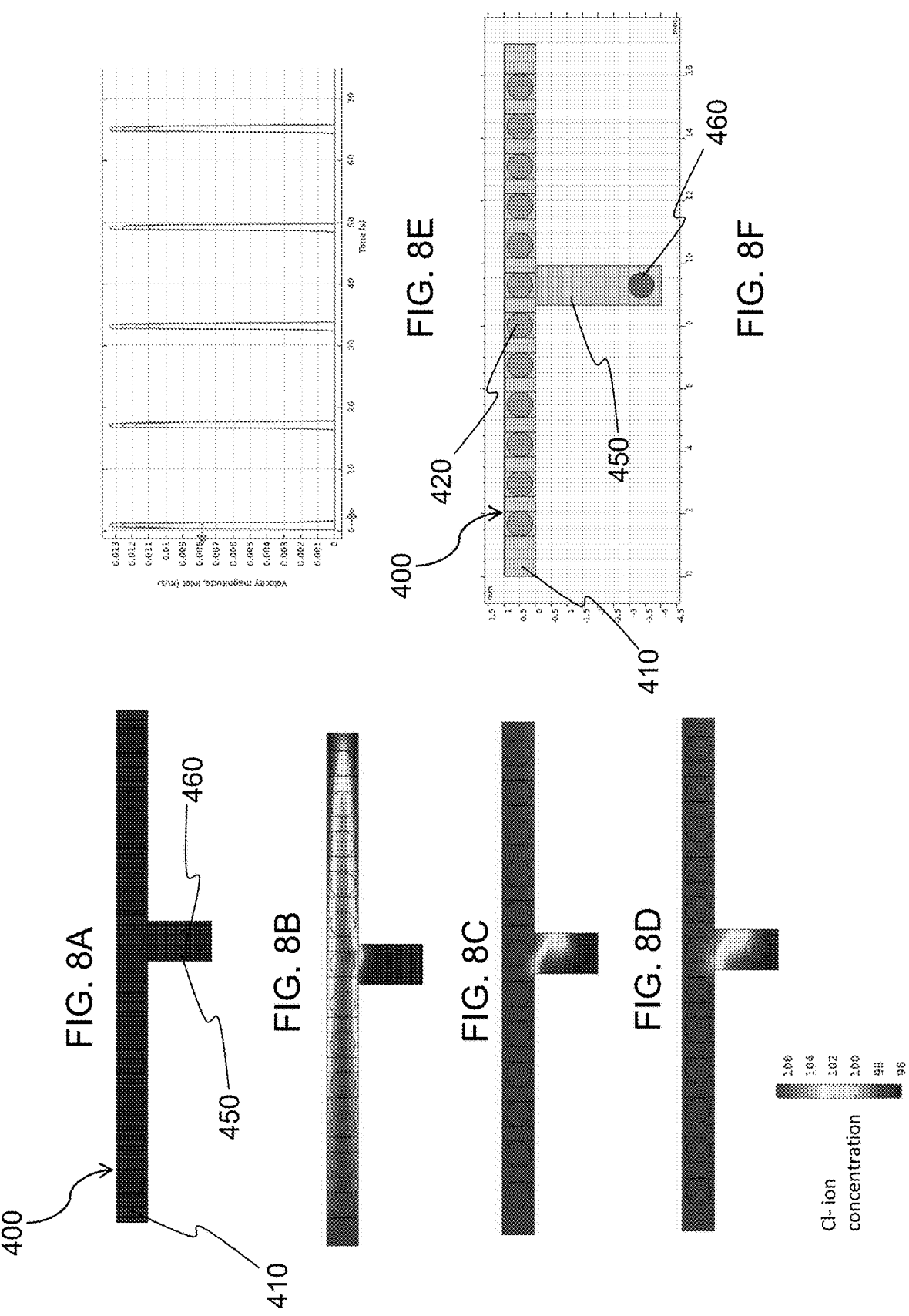
FIGS. 8A to 8D show a plan view of a sensing assembly used in Example 1 and the results of Example 1.
FIG. 8E provides a graph of the pulse cycle of Example 1.
FIG. 8F provides a plan view of the sensing assembly used in Example 1.

In this example, FIGS. 8A to 8D depict the progression of change in the chloride ion concentration as a fluid sample is supplied to the sensing assembly 400 in a simulation. In FIG. 8A the primary and secondary fluid channels 410, 450 are filled with a fluid (calibration fluid) having a Cl– concentration of 96 mM. An inflow of a fluid (equivalent to a fluid sample) with a chloride concentration of 107 mM is provided to the primary sensing assembly in a series of pulses. Specifically, 5 equal pulses of fluid were provided with the total volume of the fluid equaling three times the total volume of the sensing structure in this Example. FIG. 8E depicts the fluid delivery to the sensing assembly 400, with the 5 pulses occurring at approximately 0, 18, 33, 48 and 65 seconds. Peak fluid flow (velocity magnitude at inlet in m/s) was 0.013.

FIG. 8A shows the chloride ion concentration at 0 seconds. FIG. 8B shows the chloride ion concentration at 10 seconds. FIG. 8C shows the chloride ion concentration at 60 seconds. FIG. 8D shows the chloride ion concentration at 95 seconds. As can be seen, ingress of the higher concentration fluid into the secondary fluid channel 450 is negligible after 10 seconds and minimal after 30 s. The chloride concentration further into the secondary fluid channel 450 in the region of the reference electrode element 460 remains substantially constant over the 95 s such that the reference electrode potential would remain stable. Indeed, many measurement operations are significantly less than 95 s.

Example 2

Example 1 was repeated, but with differing dimensions for the secondary fluid channel 450. Specifically, the length of the secondary fluid channel 450 (from opening 455 to the terminal opposite end of the secondary fluid channel 450). The dimensions of the length of the secondary fluid channel 450 were 1 mm, 2 mm, 3 mm and 4 mm. The reference electrode element 460 is approximately 0.8 mm in diameter.

Figure 9:
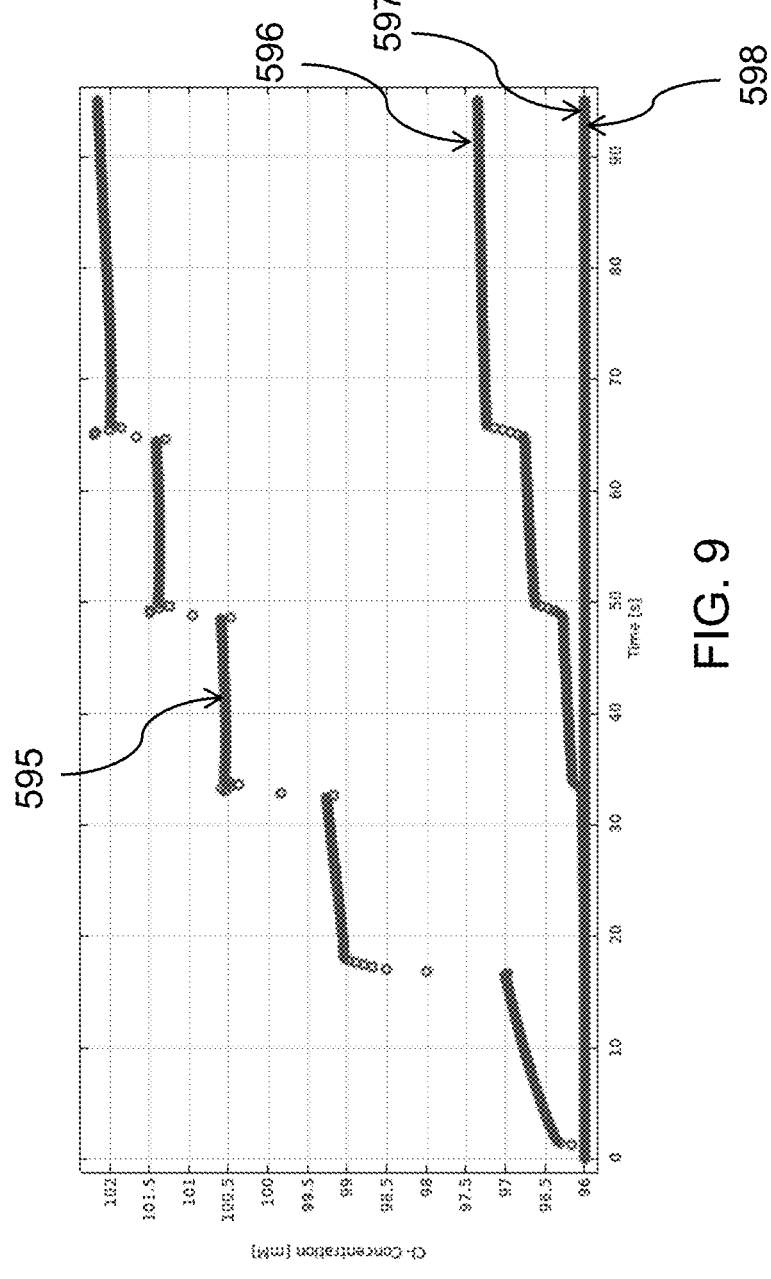
FIG. 9 provides a graph of the results of Example 2.

FIG. 9 is a graph depicting the chloride ion concentration over time at the reference electrode element 460. FIG. 9 shows the chloride ion concentration over time (up to 100 seconds) for the secondary fluid channel 450 (having the reference electrode element 460 disposed therein) depth of 1 mm (595), depth of 2 mm (596), depth of 3 mm (597) and depth of 4 mm (598). As can be seen, for the example of 1 mm, the pulses of higher concentration fluid causes some changes in the concentration of chloride ions at the reference electrode element 460 over time. For the 2 mm secondary fluid channel 450 length, there was no significant change in the chloride ion concentration at the reference electrode element 460 for in excess of 30 seconds. For the 3 mm and 4 mm secondary fluid channel 450 lengths, there was no significant change in the chloride concentration at the reference electrode element 460 for the duration of the experiment. Total change for 3 mm after 90 seconds was <0.01% and total change for 4 mm was <0.0005%. This demonstrates that even at short lengths, stability of chloride ion concentration can be maintained in the secondary fluid channel 450 and this is over significant exposure periods well in excess of that required to conduct some measurements where the reference electrode element is completely removed from the primary fluid channel (e.g. 2 mm cove depth), even where pulses are used.

Example 3

FIGS. 10A to 10D depict the results of the same experiment as Example 1, with the difference that only a single pulse of fluid was used. The total volume delivered was identical. Peak fluid flow (velocity magnitude at inlet in m/s) was 0.067. The sensing assembly structure was identical as that used in Example 1.

Figures 10A, 10B, 10C, 10D:
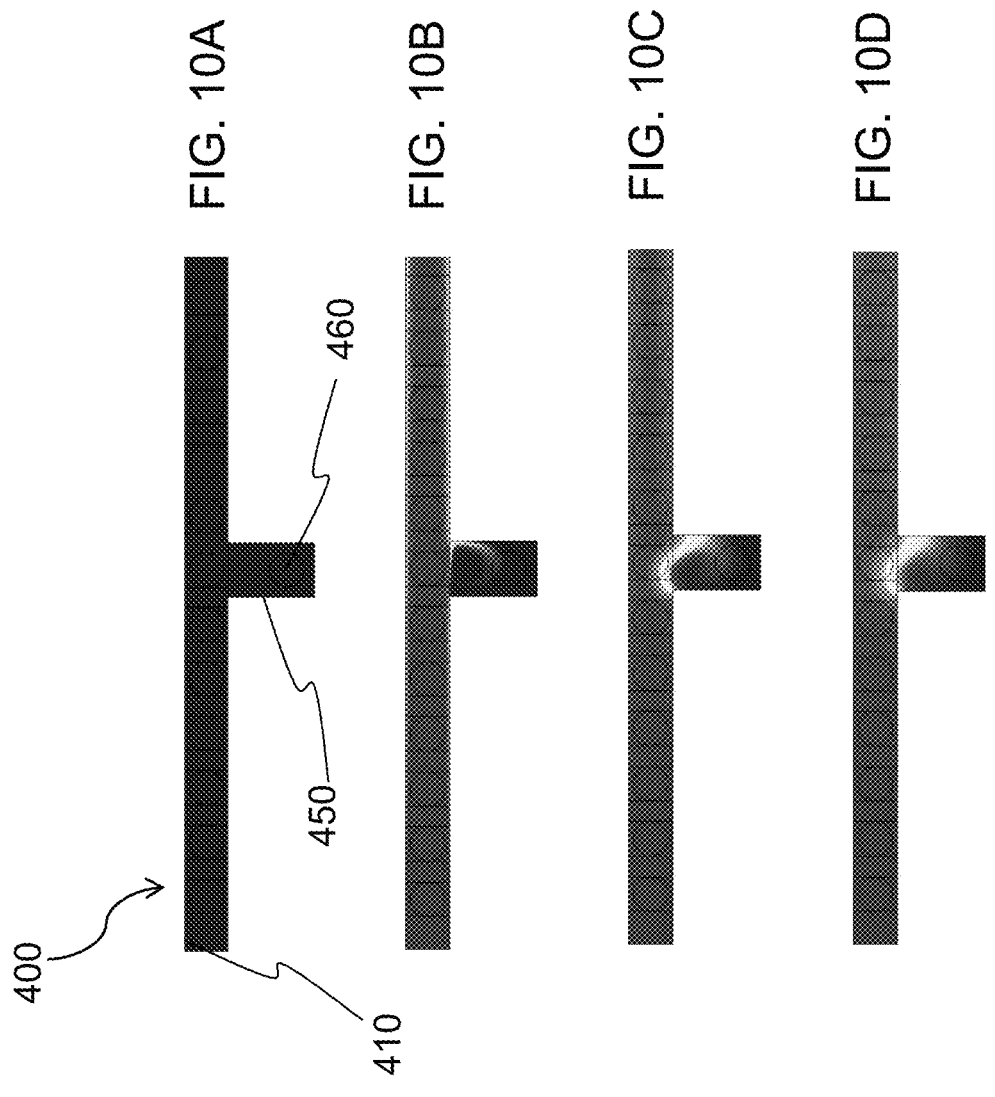
FIG. 10A to 10D show a plan view of a sensing assembly used in Example 3 and the results of Example 3.

FIG. 10A shows the chloride ion concentration at 0 seconds. FIG. 10B shows the chloride ion concentration at 1 second. FIG. 10C shows the chloride ion concentration at 15 seconds. FIG. 10D shows the chloride ion concentration at 31 seconds. As can be seen, ingress of the higher concentration fluid into the secondary fluid channel 450 is minimal even after 31 s. The chloride concentration further into the secondary fluid channel 450 in the region of the reference electrode element 460 remains substantially constant over the whole period such that the reference electrode potential would remain stable.

Example 4

Figures 11A, 11B:
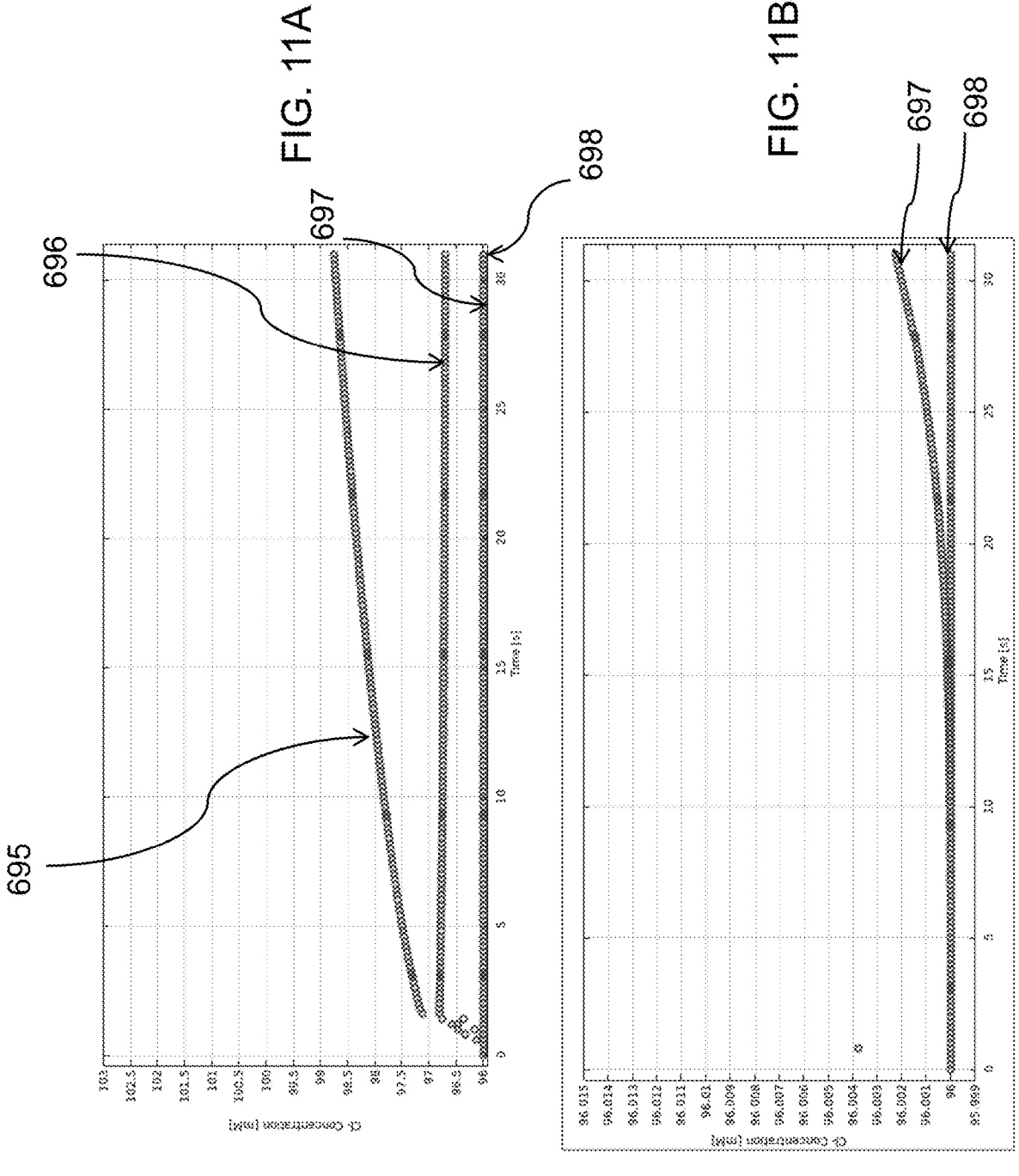
FIGS. 11A and 11B provide a graph of the results of Example 4.

Example 3 was repeated, but with differing dimensions for the secondary fluid channel 450. Specifically, the length of the secondary fluid channel 450 (from opening 455 to the terminal opposite end of the secondary fluid channel 450). The dimensions of the length of the secondary fluid channel 450 were 1 mm, 2 mm, 3 mm and 4 mm. The reference electrode element 460 was approximately 0.8 mm in diameter FIG. 11A is a graph depicting the chloride ion concentration over time at the reference electrode element 460. FIG. 11A shows the chloride ion concentration over time (up to 100 seconds) for the secondary fluid channel 450 (having the reference electrode element 460 disposed therein) depth of 1 mm (695), depth of 2 mm (696), depth of 3 mm (697) and depth of 4 mm (698). As can be seen, for the example of 1 mm, the pulses of higher concentration fluid causes some changes in the concentration of chloride ions at the reference electrode element 460. For the 2 mm secondary fluid channel 450 length, the level remained stable after an initial shift. For the 3 mm and 4 mm secondary fluid channel 450 lengths, there was no significant change in the chloride concentration at the reference electrode element 460 for the duration of the experiment. Total change for 3 mm after 30 seconds was 0.002% and total change for 4 mm was <0.0001%. This demonstrates that even at short lengths of 2 mm, stability of chloride ion concentration can be maintained in the secondary fluid channel 450 over significant exposure periods well in excess of that required to conduct some measurements. Even at 1 mm, there was some resistance as compared to what is seen by a reference electrode element located within the primary fluid channel.

It should be understood that the detailed description and specific examples, while indicating exemplary embodiments of the apparatus, systems and methods, are intended for purposes of illustration only and are not intended to limit the scope. These and other features, aspects, and advantages of the apparatus, systems and methods of the present invention can be better understood from the description, appended claims or aspects, and accompanying drawings. It should be understood that the Figures are merely schematic and are not drawn to scale. It should also be understood that the same reference numerals are used throughout the figures to indicate the same or similar parts.

Other variations to the disclosed embodiments can be understood and effected by those skilled in the art in practicing the disclosure, from a study of the drawings, the disclosure, and the appended aspects or claims. In the aspects or claims, the word "comprising" does not exclude other elements or steps, and the indefinite article "a" or "an" does not exclude a plurality. The mere fact that certain measures are recited in mutually different dependent aspects or claims does not indicate that a combination of these measures cannot be used to advantage. Any reference signs in the claims should not be construed as limiting the scope.

Select Examples

Example 101 is a sensing assembly for sensing a property of a fluid sample, the sensing assembly comprising: a primary fluid channel providing a primary flow path for a fluid sample; at least one working electrode provided in the primary fluid channel configured to sense a property of a fluid sample in the primary fluid channel; a secondary fluid channel adjacent to and fluidly connected to the primary fluid channel along the primary flow path; and a reference electrode element provided in the secondary fluid channel, wherein the secondary fluid channel is arranged as a branch from the primary fluid channel so as to limit the flow of fluid sample from the primary fluid channel to the reference electrode element.

In Example 102, the sensing assembly according to Example 101, can optionally include at least a portion of the secondary fluid channel extending tangentially relative to the primary flow path.

In Example 103, the sensing assembly according to Example 101 or Example 102, can optionally include the secondary fluid channel being fluidly connected to the primary fluid channel through an inlet portion of the secondary fluid channel, the inlet portion comprising an opening in a sidewall of the primary fluid channel.

In Example 104, the sensing assembly according to Example 103, can optionally include the inlet portion of the secondary fluid channel being tangential to the primary flow path.

In Example 105, the sensing assembly according to Example 104, can optionally include the inlet portion of the secondary channel being substantially perpendicular to the primary flow path.

In Example 106, the sensing assembly according to any one of Examples 103 to 105, can optionally include the inlet portion of the secondary channel being tapered so as to reduce the diameter of the secondary fluid channel over at least a portion of the length of the secondary fluid channel.

In Example 107, the sensing assembly according to any one of Examples 103 to 105, can optionally include the reference electrode element being spaced from the opening of the secondary fluid channel.

In Example 108, the sensing assembly according to any one of Examples 101-107, can optionally include the secondary fluid channel being enclosed so as to define a recess.

In Example 109, the sensing assembly according to any one of Examples 101-108, can optionally include the secondary fluid channel comprising an outlet and a moveable closure element for closing the outlet.

In Example 110, the sensing assembly according to any one of Examples 101-109, can optionally include the reference electrode element comprising a metal and a metal salt.

In Example 111, the sensing assembly according to Example 110, can optionally include the reference electrode element comprising a metal and metal salt selected from (i) Ag and AgCl; (ii) Hg and $Hg_2Cl_2$; and (iii) Cu and $CuSO_4$.

In Example 112, the sensing assembly according to any one of Examples 101-111, can optionally include the at least one working electrode being an electrode configured to detect the concentration of chloride in a fluid sample.

In Example 113, the sensing assembly according to any one of Examples 101-112, can optionally include the sensing assembly further comprising a calibration fluid provided in the secondary fluid channel, wherein the calibration fluid and reference electrode element form a reference electrode.

Example 114 is a system for sensing a property of a fluid sample, the system comprises: a sensing assembly according to any preceding claim; and a fluid delivery assembly configured to deliver fluid to the primary fluid channel along the primary flow path.

In Example 115, the system according to Example 114, can optionally include: a signal processing unit configured to process sensor signals received from the reference electrode element and the at least one working electrode; and a property determination unit configured to, based at least in part on the sensor signals processed from the at least one working electrode and the reference electrode element, determine a property of the fluid sample.

In Example 116, the system according to Example 114 or 115, can optionally include a calibration fluid reservoir, wherein the fluid delivery assembly is configured to deliver reference solution from the reservoir to the primary fluid channel.

In Example 117, the system according to Example 116, can optionally include the fluid delivery assembly being configured to deliver fluid sample to the primary fluid channel in a measurement operation and is configured to deliver the calibration fluid in a flush operation, wherein the ratio of the measurement operation to the flush operation is at least 1:2.

Example 118 is a method for determining a property of a sample comprises: providing a sensing assembly for sensing a property of a fluid sample, the sensing assembly comprising a primary fluid channel providing a primary flow path for a fluid sample, at least one working electrode provided in the primary fluid channel configured to sense a property of a fluid sample in the primary fluid channel, a secondary fluid channel adjacent to and fluidly connected to the primary fluid channel along the primary flow path; and a reference electrode element for providing a reference electrode signal provided in the secondary fluid channel, wherein the secondary fluid channel is arranged as a branch from the primary fluid channel so as to limit the flow of fluid sample from the primary fluid channel to the reference electrode element; providing a fluid sample to the primary fluid channel; and determining the property of the fluid sample, based at least in part on sensor signals received from the sensor assembly.

In Example 119, the method according to Example 118 can optionally include providing a calibration fluid to the secondary fluid channel.

In Example 120, the method according to Example 119 can optionally include ratio of the provision of the fluid sample to the provision of the calibration fluid being at least 1:2.

The invention claimed is:

1. A sensing assembly for sensing a property of a fluid sample, the sensing assembly comprising:
   a primary fluid channel extending from an inlet to an outlet and providing a primary flow path for the fluid sample to flow in a flow direction from the inlet to the outlet;
   at least one working electrode provided in the primary fluid channel configured to sense the property of the fluid sample in the primary fluid channel;
   a secondary fluid channel adjacent to and fluidly connected to the primary fluid channel along the primary flow path at a point downstream from the at least one working electrode; and
   a reference electrode element provided in the secondary fluid channel,
   wherein the secondary fluid channel is arranged as a branch from the primary fluid channel and is angled back relative to the flow direction of the primary flow path so as to limit a flow of the fluid sample from the primary fluid channel to the reference electrode element, and the secondary fluid channel is enclosed so as to define an enclosure or cove to prevent flow through the secondary fluid channel.

2. The sensing assembly according to claim 1, wherein at least a portion of the secondary fluid channel extends tangentially relative to the primary flow path.

3. The sensing assembly according to claim 1, wherein the secondary fluid channel is fluidly connected to the primary fluid channel through an inlet portion of the secondary fluid channel, the inlet portion comprising an opening in a sidewall of the primary fluid channel.

4. The sensing assembly according to claim 3, wherein the inlet portion of the secondary fluid channel is tangential to the primary flow path.

5. The sensing assembly according to claim 3, wherein the reference electrode element is spaced from the opening of the secondary fluid channel.

6. The sensing assembly according to claim 1, wherein the secondary fluid channel comprises an outlet and a moveable closure element for selectively closing the outlet to prevent the flow through the secondary fluid channel.

7. The sensing assembly according to claim 1, wherein the reference electrode element comprises a metal and a metal salt.

8. The sensing assembly according to claim 7, wherein the metal and the metal salt are selected from the group consisting of: (i) Ag and AgCl; (ii) Hg and $Hg_2Cl_2$; and (iii) Cu and $CuSO_4$.

9. The sensing assembly according to claim 1, wherein the at least one working electrode is an electrode configured to detect a concentration of chloride in the fluid sample.

10. The sensing assembly according to claim 1, wherein the sensing assembly further comprises a calibration fluid provided in the secondary fluid channel, wherein the calibration fluid and the reference electrode element form a reference electrode.

11. A system for sensing a property of a fluid sample comprises:

the sensing assembly according to claim 1; and a fluid delivery assembly configured to deliver the fluid sample to the primary fluid channel along the primary flow path.

12. The system according to claim 11, further comprising:

a signal processing unit configured to process sensor signals received from the reference electrode element and the at least one working electrode; and a property determination unit configured to, based at least in part on the sensor signals processed from the at least one working electrode and the reference electrode element, determine the property of the fluid sample.

13. The sensing assembly according to claim 1, wherein the secondary fluid channel is angled back relative to the flow direction of the primary flow path at an obtuse angle relative to a central axis of the primary flow path.

14. The sensing assembly according to claim 1, wherein the at least one working electrode comprises a plurality of working electrodes.

15. A method for determining a property of a fluid sample comprises:

providing a sensing assembly for sensing the property of the fluid sample, the sensing assembly comprising a primary fluid channel providing a primary flow path for the fluid sample, at least one working electrode provided in the primary fluid channel configured to sense the property of the fluid sample in the primary fluid channel, a secondary fluid channel adjacent to and fluidly connected to the primary fluid channel along the primary flow path at a point downstream from the at least one working electrode; and a reference electrode element for providing a reference electrode signal provided in the secondary fluid channel, wherein the secondary fluid channel is arranged as a branch from the primary fluid channel and is angled back relative to a flow direction of the primary flow path so as to limit a flow of the fluid sample from the primary fluid channel to the reference electrode element, the secondary fluid channel is enclosed so as to define an enclosure or cove to prevent flow through the secondary fluid channel;

providing the fluid sample to the primary fluid channel; and determining the property of the fluid sample, based at least in part on sensor signals received from the sensing assembly.

16. The method according to claim 15, further comprising providing a calibration fluid to the secondary fluid channel.

* * * * *